(12) United States Patent
Vitorino et al.

(10) Patent No.: US 8,862,993 B2
(45) Date of Patent: Oct. 14, 2014

(54) AUDIO DEVICE CONTROL METHOD AND APPARATUS

(75) Inventors: Rita Vitorino, S. Domingos Rana (PT); Mart Kelder, Tallinn (EE); Julian Spittka, San Fransisco, CA (US)

(73) Assignee: Skype, Dublin (IE)

( * ) Notice: Subject to any disclaimer, the term of this patent is extended or adjusted under 35 U.S.C. 154(b) by 670 days.

(21) Appl. No.: 12/220,436

(22) Filed: Jul. 24, 2008

(65) Prior Publication Data

US 2009/0319898 A1   Dec. 24, 2009

(30) Foreign Application Priority Data

Jun. 18, 2008   (GB) .................................. 0811194.0

(51) Int. Cl.
 *G06F 3/048*   (2013.01)
 *G06F 15/16*   (2006.01)
 *H04M 1/253*   (2006.01)
 *H04L 29/06*   (2006.01)

(52) U.S. Cl.
 CPC ......... *H04L 65/1069* (2013.01); *H04M 1/2535* (2013.01); *H04L 65/1059* (2013.01); *H04L 65/80* (2013.01)
 USPC .......................................... 715/716; 709/204

(58) Field of Classification Search
 USPC ......................................................... 715/716
 See application file for complete search history.

(56) References Cited

U.S. PATENT DOCUMENTS

| | | | |
|---|---|---|---|
| 5,495,522 A * | 2/1996 | Allen et al. ............... | 379/202.01 |
| 6,870,919 B2 | 3/2005 | Dobler | |
| 8,060,366 B1 * | 11/2011 | Maganti et al. ............... | 704/246 |
| 2004/0125232 A1 * | 7/2004 | Matsunami ..................... | 348/500 |
| 2005/0141485 A1 * | 6/2005 | Miyajima et al. ............. | 370/352 |
| 2005/0233777 A1 * | 10/2005 | Twerdahl ...................... | 455/567 |
| 2006/0193459 A1 | 8/2006 | Cadiz et al. | |
| 2007/0025335 A1 * | 2/2007 | Patel et al. .................... | 370/352 |
| 2007/0150719 A1 * | 6/2007 | Bear et al. ..................... | 713/100 |
| 2008/0132275 A1 * | 6/2008 | Eastwood ................. | 455/556.1 |

FOREIGN PATENT DOCUMENTS

| | | |
|---|---|---|
| GB | 2 420 935 A | 6/2006 |
| JP | 2005045742 A | 2/2005 |
| WO | WO-9837483 | 8/1998 |
| WO | WO 03/096660 A1 | 11/2003 |
| WO | WO 2005/009019 A2 | 1/2005 |

OTHER PUBLICATIONS

International Search Report for Application No. GB0811194.0 date of mailing Sep. 10, 2008.

(Continued)

*Primary Examiner* — Peiyong Weng
(74) *Attorney, Agent, or Firm* — Sonia Cooper; Jim Ross; Micky Minhas (57) ABSTRACT

A method of controlling an audio output device at a user terminal connected to a communication network and executing a communication client is provided. The method comprises: establishing a connection between a user of the user terminal and a further user over the communication network; responsive to establishing the connection, analyzing the status of the audio output device with the communication client; in the case that the communication client determines that the audio output device is in a muted state, controlling the audio output device to deactivate the muted state such that audio information transmitted from the further user via the connection can be heard by the user of the user terminal.

27 Claims, 7 Drawing Sheets

(56) References Cited

OTHER PUBLICATIONS

Notification of Transmittal of the International Search Report and the Written Opinion of the International Searching Authority, or the Declaration, for Application No. PCT/EP2009/057563, dated Sep. 28, 2009.
"Examination Report", Application No. GB0811194.0, (Mar. 8, 2012), 3 pages.
"Foreign Notice of Opposition", EP Application No. 09765880.1, (Jul. 12, 2013), 21 pages.
"Microsoft Office Communicator 2007 Deployment Guide", (Jul. 2007), 38 pages.
"Microsoft Office Communicator 2007 Getting Started", retrieved from http://www.ittdublin.ie/media/Media,22233,en.pdf, (Jul. 2007), 77 pages.
"Polycom Soundstation IP 4000 SIP", *Communicate your ideas clearly with impact*, (Apr. 2006), 2 pages.
"SoundStation IP 4000 SIP 3.0 User Guide", (Jan. 2008), 25 pages.
"Windows volume maximising / unmuting when call incoming", (Apr. 16, 2013), 2 pages.

* cited by examiner

AUDIO DEVICE CONTROL METHOD AND APPARATUS

RELATED APPLICATION

This application claims priority under 35 U.S.C. §119 or 365 to Great Britain, Application No. 0811194.0, filed Jun. 18, 2008. The entire teachings of the above application are incorporated herein by reference.

TECHNICAL FIELD

This invention relates to an audio device control method and apparatus.

BACKGROUND

Packet-based communication systems allow the user of a device, such as a personal computer, to communicate across a computer network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication. In addition to voice communication, the client may also provide further features such as video calling, instant messaging, voicemail and file transfer.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

The correct configuration of the audio devices used to place a call over a VoIP system is a very important issue. A large proportion of users who have problems making VoIP calls report issues such as one caller not being able to hear the other, echo on the call, or background noise. Most frequently, these problems are technical problems related to the configuration of audio devices. Configuration problems such as these therefore result in large numbers of potential users ceasing to use a VoIP system.

SUMMARY

The inventors have appreciated that a particular problem exists because the audio devices connected to the device of the user can be controlled by many different software elements executed on the device. For example, the audio devices can be independently controlled by the operating system, the client software and third party software. The inventors have found that this often leads to user confusion, as the user does not appreciate that setting the state of an audio device using, for example, the operating system affects the operation of the VoIP client software. The result of this is that users incorrectly configure their audio devices, and are consequently unable to make calls over the VoIP system.

According to one aspect of the present invention there is provided a method of controlling an audio output device at a user terminal connected to a communication network and executing a communication client, comprising: establishing a connection between a user of the user terminal and a further user over the communication network; responsive to establishing the connection, analysing the status of the audio output device with the communication client; in the case that the communication client determines that the audio output device is in a muted state, controlling the audio output device to deactivate the muted state such that audio information transmitted from the further user via the connection can be heard by the user of the user terminal.

Because the communication client determines that the user wishes to proceed with communication with the further user (as the connection is established) and determines that the audio output device is muted, a situation is detected which would otherwise prevent the communication from continuing. The communication client changes the settings of the audio output device to counter this, and, hence the communication client enables the communication between the user and further user to proceed successfully, with the user being able to hear the further user. The communication client therefore prevents a communication problem from being experienced by the user, thereby improving the usability and quality of the communication system.

In one embodiment, the step of establishing a connection comprises the user of the user terminal initiating a call with the further user. Preferably, the step of establishing a connection comprises the further user answering a call initiated by the user of the user terminal.

Because the step of establishing the connection requires the call to be answered it is ensured that the call is actually taking place before any changes to the audio output device settings are made. The user must make a positive decision to answer the call, signalling an intention that the call should proceed, before the audio output device settings are altered.

In another embodiment, the step of establishing a connection comprises the further user initiating a call with the user of the user terminal. Preferably, the step of establishing a connection comprises the user of the user terminal answering a call initiated by the further user.

As the audio output device is only un-muted after an incoming call is answered by the user, then the incoming call will not disturb the user by producing a ringing tone. This is advantageous, because if the user has deliberately muted the audio output device, the communication client should not ring when there is an incoming call. However, by answering the call the user has indicated a positive intention to continue with the call, thereby indicating that the communication client should determine whether to change the audio output device settings.

In one embodiment, the call is a voice call. In another embodiment, the call is a video call.

Preferably, the step of controlling the audio output device further comprises the communication client accessing user preference data stored at the user terminal to determine whether the communication client is permitted to control the audio output device. In the case that the communication client is permitted to control the audio output device, the method comprises the communication client deactivating the muted state automatically without interaction from the user of the user terminal. In the case that the communication client is not permitted to control the audio output device, the method comprises displaying a notification message in a user interface of the user terminal such that the user is notified that the audio output device is in a muted state.

By displaying the notification message to the user, the user is informed of the muting of the audio output device, such that it becomes clear that the output audio device settings, which can be controlled through the OS, can affect the operation of the communication client. This increases user awareness and avoids similar problems occurring in subsequent calls.

Preferably, the notification message comprises a user-operable control arranged to deactivate the muted state upon actuation by the user. Preferably, the method further comprises the step of removing the notification message from the user interface after the notification message has been displayed for a predetermined length of time if the user-operable control is not actuated by the user.

Preferably, the step of controlling the audio output device to deactivate the muted state comprises storing an indicator that the status of the audio output device has been changed in a storage means. Preferably, the method further comprises the steps of detecting at the communication client that the connection between a user of the user terminal and a further user has been terminated; reading the indicator from the storage means; and restoring the status of the audio output device to the muted state if the status of the audio output device has been changed.

By restoring the muted state of the audio output device, it can be ensured that the removal of the mute setting only occurs for the duration of the call. The user has given his approval to un-mute the audio output device for the purposes of the call over the communication system, but not for any other purpose. The restoration of the mute setting prevents user being disturbed by the user terminal subsequently emitting sounds, for which has not explicitly selected to un-mute the audio output device.

Preferably, the communication network is a packet-based communication network. In one embodiment, the packet-based communication network is a voice over internet protocol communication network. In another embodiment, the packet-based communication network is a peer-to-peer communication network.

According to another aspect of the present invention, there is provided a user terminal, comprising: means for connecting the user terminal to a communication network; an audio output device; and processing means arranged to execute a communication client, wherein the communication client is arranged to establish a connection between a user of the user terminal and a further user over the communication network, analyse the status of the audio output device responsive to establishing the connection, and, in the case that the communication client determines that the audio output device is in a muted state, control the audio output device to deactivate the muted state such that audio information transmitted from the further user via the connection can be heard by the user of the user terminal.

According to another aspect of the present invention there is provided a computer program product comprising program code means which, when executed by a computer implement the steps according to the above-described method.

BRIEF DESCRIPTION OF THE DRAWINGS

For a better understanding of the present invention and to show how the same may be put into effect, reference will now be made, by way of example, to the following drawings in which.

DETAILED DESCRIPTION

Figure 1:
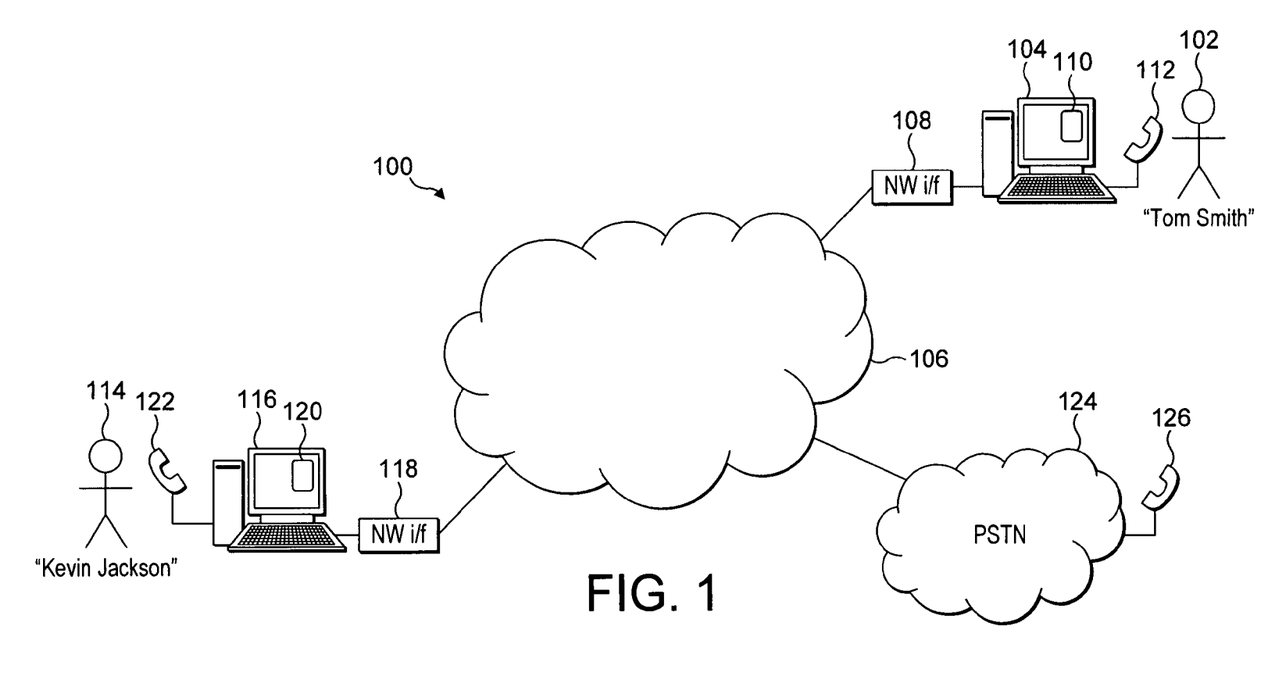
FIG. 1 shows a P2P VoIP communication system.

Reference is first made to FIG. 1, which illustrates a P2P communication system 100. Note that whilst this illustrative embodiment is described with reference to a P2P communication system, other types of communication system could also be used, such as non-P2P, VoIP systems. A first user of the communication system (named "Tom Smith" 102) operates a user terminal 104, which is shown connected to a network 106. Note that the network 106 utilises a communication system such as the Internet. The user terminal 104 may be, for example, a personal computer ("PC") (including, for example, Windows™, Mac OS™ and Linux™ PCs), a personal digital assistant ("PDA"), a mobile phone, a gaming device or other embedded device able to connect to the network 106. The user device is arranged to receive information from and output information to a user of the device. In a preferred embodiment of the invention the user device comprises a display such as a screen and a keyboard and mouse. The user device 104 is connected to the network 106 via a network interface 108 such as a modem, and the connection between the user terminal 104 and the network interface 108 may be via a cable (wired) connection or a wireless connection.

The user terminal 104 is running a communication client 110, provided by the software provider. The communication client 110 is a software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, or as a separate loudspeaker and microphone independently connected to the user terminal 104.

Figure 2:
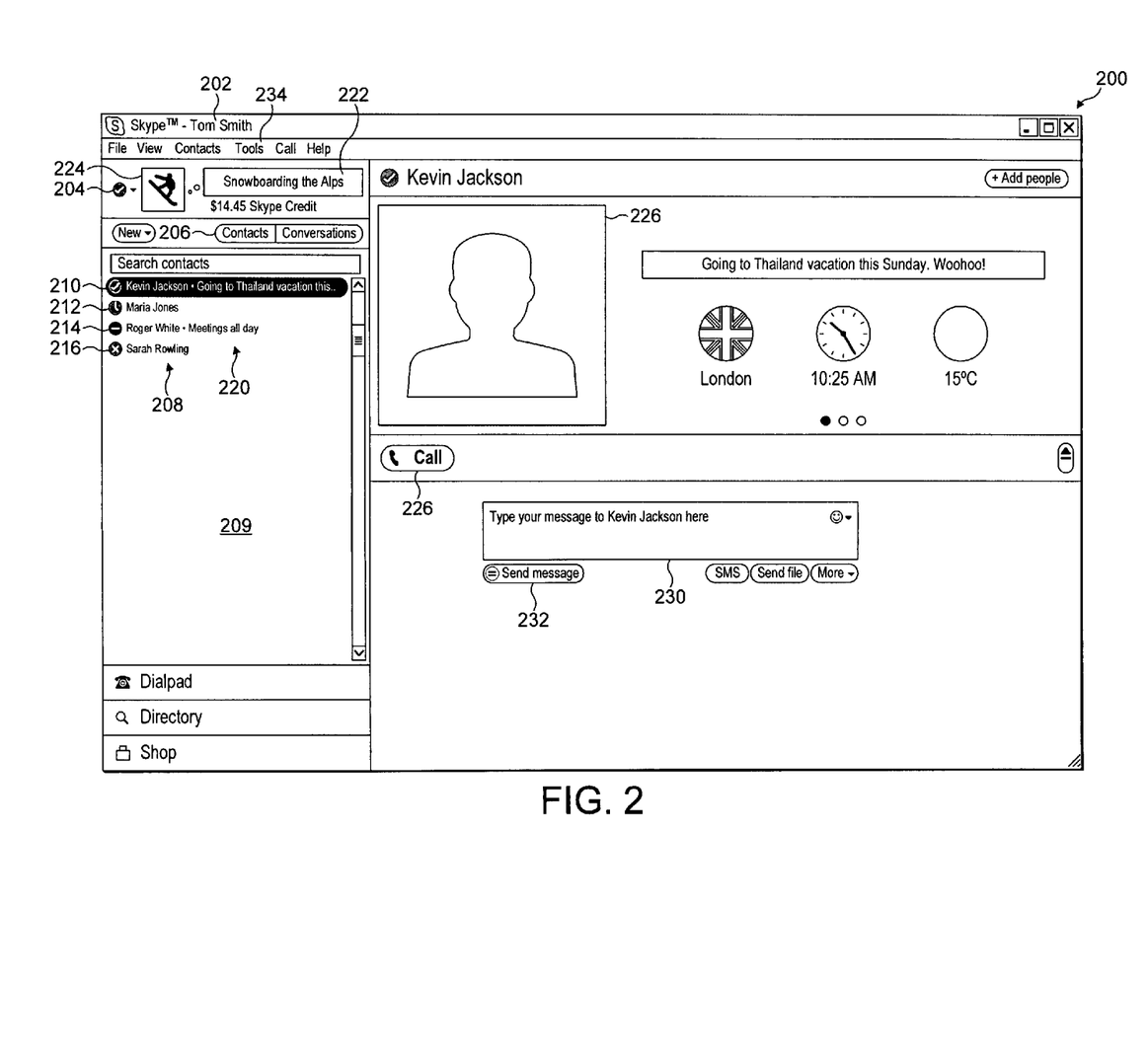
FIG. 2 shows a user interface of a VoIP communication client.

An example of a user interface 200 of the communication client 110 executed on the user terminal 104 of the first user 102 is shown illustrated in FIG. 2. The client user interface 200 displays the username 202 of "Tom Smith" 102 in the communication system, and the user can set his own presence state (that will be seen by other users) using a drop down list by selecting icon 204.

The client user interface 200 comprises a button 206 labelled "contacts", and when this button is selected the contacts stored by the user in a contact list are displayed in a pane

209 below the button 206. In the example user interface in FIG. 2, four contacts of other users of the communication system are shown listed in contact list 208. Each of these contacts have authorised the user of the client 110 to view their contact details and presence state and mood message information. Each contact in the contact list has a presence status icon associated with it. For example, the presence status icon for "Kevin Jackson" 210 indicates that this contact is "online", the presence icon for "Maria Jones" 212 indicates that this contact is "away", the presence icon for "Roger White" 214 indicates that this contact's state is "do not disturb", the presence icon for "Sarah Rowling" 216 indicates that this contact is "offline". Further presence indications can also be included. Next to the names of the contacts in pane 209 are mood messages 220 of the contacts.

The contact list for the users (e.g. the contact list 208 for "Tom Smith") is stored in a contact server (not shown in FIG. 1). When the client 110 first logs into the communication system the contact server is contacted, and the contact list is downloaded to the user terminal 104. This allows the user to log into the communication system from any terminal and still access the same contact list. The contact server is also used to store the user's own mood message (e.g. a mood message 222 of the first user 102) and a picture 224 selected to represent the user (known as an avatar). This information can be downloaded to the client 110, and allows this information to be consistent for the user when logging on from different terminals. The client 110 also periodically communicates with the contact server in order to obtain any changes to the information on the contacts in the contact list, or to update the stored contact list with any new contacts that have been added. Presence state information is not stored centrally in the contact server. Rather, the client 110 periodically requests the presence state information for each of the contacts in the contact list 208 directly over the communication system. Similarly, the current mood message for each of the contacts, as well as a picture (avatar—e.g. picture 226 for "Kevin Jackson") that has been chosen to represent the contact, are also retrieved by the client 110 directly from the respective clients of each of the contacts over the communication system.

Calls to the users in the contact list may be initiated over the communication system by selecting the contact and clicking on a "call" button 228 using a pointing device such as a mouse. Referring again to FIG. 1, the call set-up is performed using proprietary protocols, and the route over the network 106 between the calling user and called user is determined by the peer-to-peer system without the use of servers. For example, the first user "Tom Smith" 102 can call a second user "Kevin Jackson" 114.

Following authentication through the presentation of digital certificates (to prove that the users are genuine subscribers of the communication system—described in more detail in WO 2005/009019), the call can be made using VoIP. The client 110 performs the encoding and decoding of VoIP packets. VoIP packets from the user terminal 104 are transmitted into the network 106 via the network interface 108, and routed to a computer terminal 116 of the called party 114, via a network interface 118. A client 120 (similar to the client 110) running on the user terminal 116 of the called user 114 decodes the VoIP packets to produce an audio signal that can be heard by the called user using the handset 122. Conversely, when the second user 114 talks into handset 122, the client 120 executed on user terminal 116 encodes the audio signals into VoIP packets and transmits them across the network 106 to the user terminal 104. The client 110 executed on user terminal 104 decodes the VoIP packets, and produces an audio signal that can be heard by the user of the handset 112.

The VoIP packets for calls between users (such as 102 and 114) as described above are passed across the network 106 only, and the public switched telephone network ("PSTN") (124) is not involved. Furthermore, due to the P2P nature of the system, the actual voice calls between users of the communication system can be made with no central servers being used. This has the advantages that the network scales easily and maintains a high voice quality, and the call can be made free to the users. Additionally, calls can also be made from the client (110, 122) using the communication system to fixed-line or mobile telephones (126), by routing the call to the PSTN network (124). Similarly, calls from fixed-line or mobile telephones (126) can be made to the communication system via the PSTN (124).

In addition to making voice calls, the user of the client 110 can also communicate with the users listed in the contact list 208 in several other ways. For example, an instant message (also known as a chat message) can be sent by typing a message in box 230 (as shown in FIG. 2) and sending it by selecting the "send message" button 232. Additionally, the first user 102 can use the client 110 to transmit files to users in the contact list 208, send voicemails to the contacts or establish video calls with the contacts (not illustrated in FIG. 2).

Figure 3:
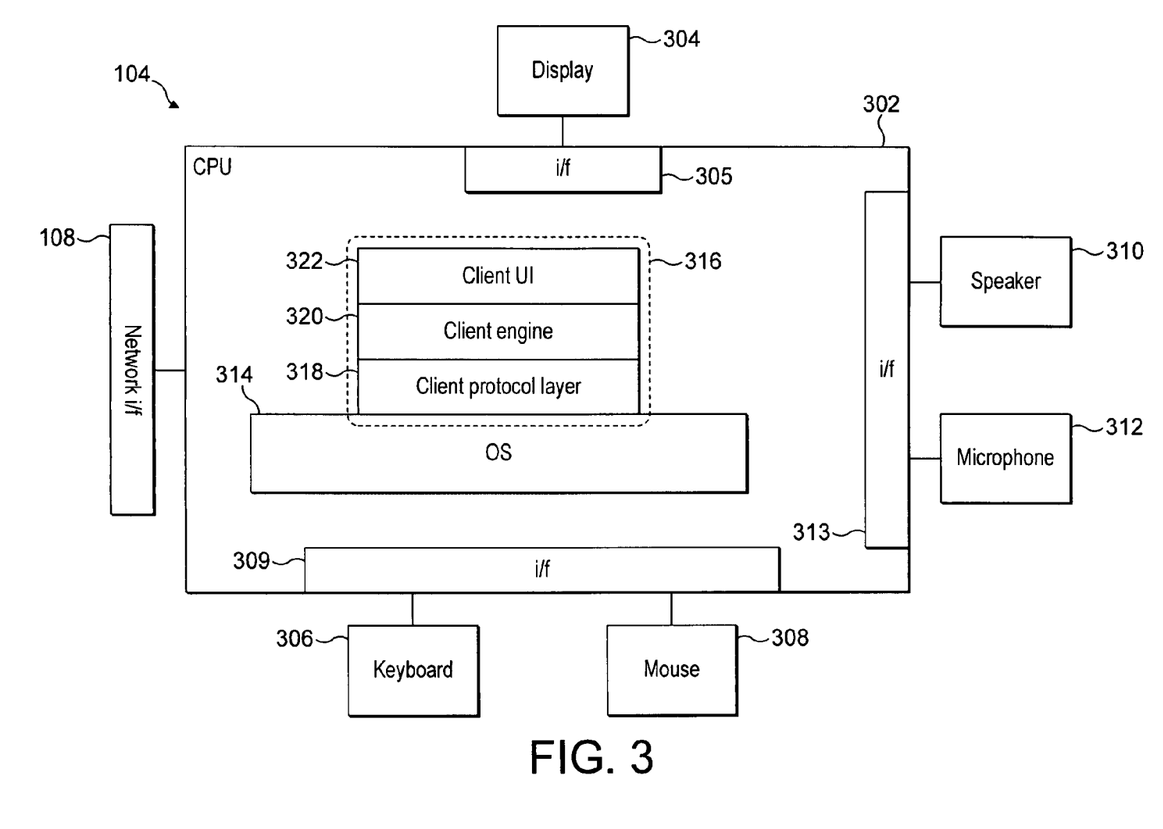
FIG. 3 shows a user terminal on which is executed a communication client.

FIG. 3 illustrates a detailed view of the user terminal 104 on which is executed client 110. The user terminal 104 comprises a central processing unit ("CPU") 302, to which is connected a display 304 such as a screen via a display interface 305, an input device such as a keyboard 306 and a pointing device such as a mouse 308 connected via an interface 309 such as USB. An output audio device 310 (e.g. a speaker) and an input audio device 312 (e.g. a microphone) are connected via an audio interface 313. The output audio device 310 and input audio device 312 may be integrated into a handset 112 or headset, or may be separate. The CPU 302 is connected to a network interface 108 as shown in FIG. 1.

FIG. 3 also illustrates an operating system ("OS") 314 executed on the CPU 302. Running on top of the OS 314 is a software stack 316 for the client 110. The software stack shows a protocol layer 318, a client engine layer 320 and a client user interface layer ("UI") 322. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 318 of the client software communicates with the operating system 314 and manages the connections over the communication system. Processes requiring higher level processing are passed to the client engine layer 320. The client engine 320 also communicates with the client user interface layer 322. The client engine 320 may be arranged to control the client user interface layer 322 to present information to the user via the user interface of the client (as shown in FIG. 2) and to receive information from the user via the user interface.

There are several reasons why users of a communication system such as that shown in FIG. 1 have problems making calls. These are often technical problems related to the configuration of the audio devices. Frequently, the cause is user mismanagement of audio devices and the lack of call environment optimisation in the client 110. Thus, users (particularly new or non-technical users) often give up and stop using the communication system. By enhancing the audio device handling in a smart and automated way, the users have an increased likelihood of making successful calls using the communication system, and therefore are more likely to continue using it.

A particular problem exists because the audio devices (310, 312) of the user terminal 104 can be controlled by several different software elements executed on the user terminal 104. For example, the state of the audio devices (310, 312) can be controlled by both the operating system 314 and the communication client 316. In addition, there may be further software elements (not shown in FIG. 3) executed on the user terminal 104 that can also set the state of the audio devices. This can lead to confusion on the part of the user, as he may set the state of an audio device using, for example, the operating system control, and this will affect the operation of the communication client 316.

Figure 4A:
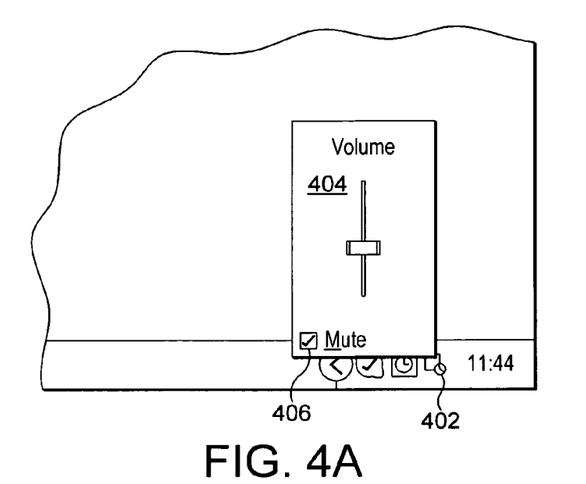
FIG. 4A shows an operating system audio control.

For example, the user 102 of the user terminal 104 can select an operating system control, such as that illustrated in FIG. 4A, by selecting an icon 402 provided by the operating system. Selecting the icon 402 displays a pop-up window 404 that allows the user to set the output audio device 310 (e.g. the speakers, headphones or handset) to be muted by actuating a check box 406. The user may select this control to prevent the user terminal from producing any sounds, for example when in a meeting or other quiet location. The mute control 406 applies to the user terminal as a whole, and therefore mutes the output audio device 310 for other applications executed on the user terminal 104. In particular, the mute control 406 will mute the output audio device 310 when the communication client 110 is used.

Therefore, if the user 102 forgets that he has muted the output audio device 310 using the control 406, and later attempts to make a call using the communication client, then he will be unable to hear what the called party is saying. An inexperienced or non-technical user can interpret this as being a problem with the communication client 110 or the communication system, and may not appreciate that this is due to an operating system setting.

Figure 4B:
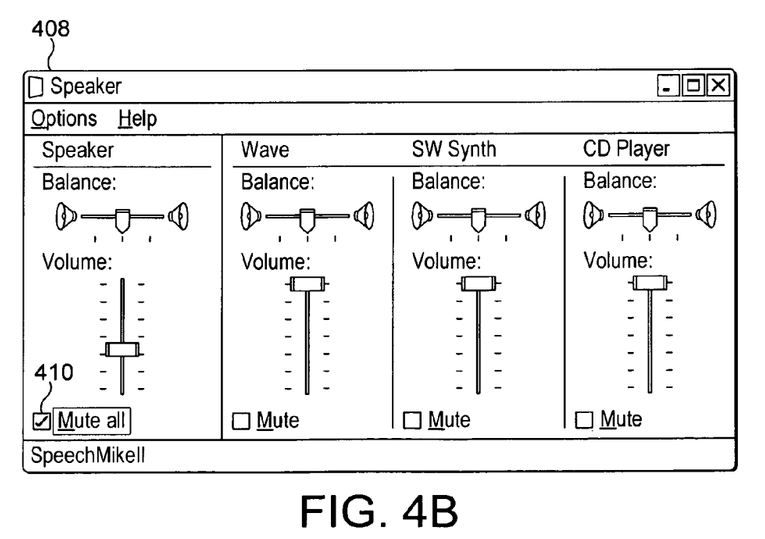
FIG. 4B shows an audio properties window.

The output audio device 310 can also be muted using other controls, such as from an audio properties window 408 as illustrated in FIG. 4B, which includes a check box 410 to mute the speakers. In addition, third party software (i.e. not the OS 314 or the communication client 110) can also control the output audio device 310. It can therefore be seen that the muting of output audio devices can happen very readily in the user terminal 104, and the consequence of this is significant if the user does not appreciate that this affects communication over the communication system.

Figure 5:
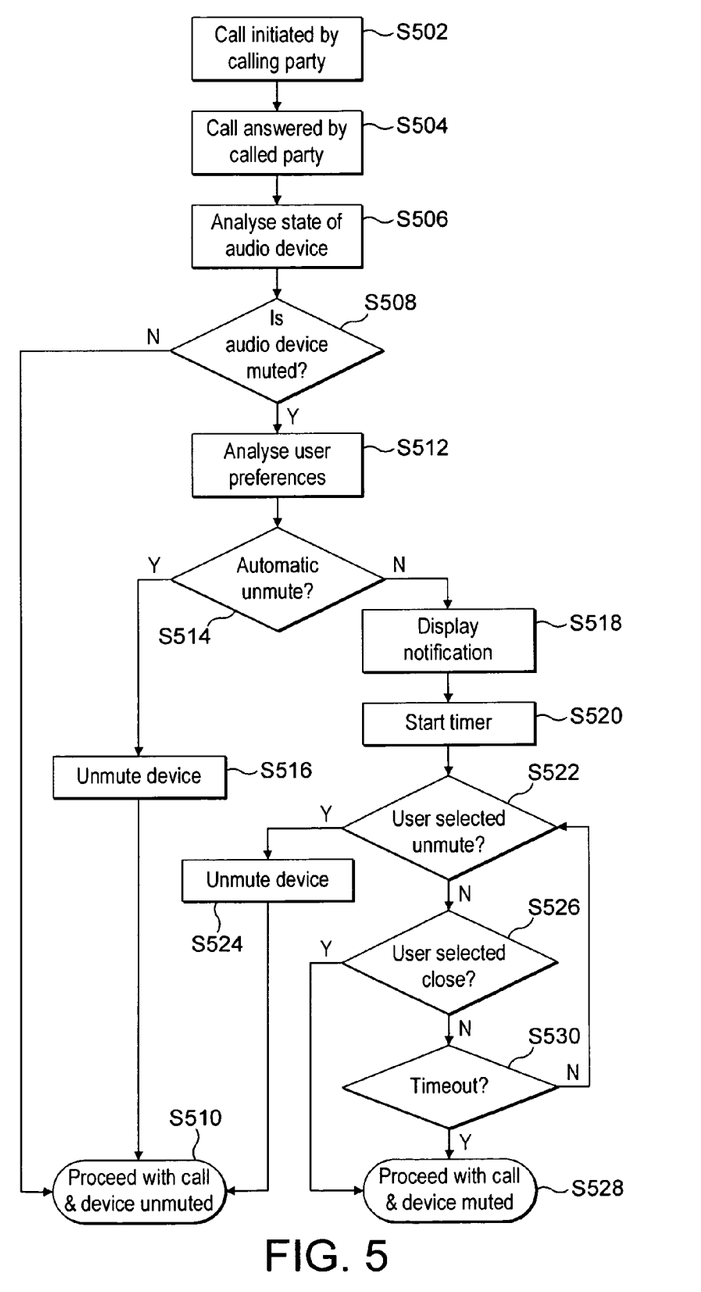
FIG. 5 shows a flowchart for handling the control of output audio devices.

FIG. 5 illustrates a flow chart for a technique of automating the control of output audio devices in the case that they are muted, and for surfacing information about the audio devices in the UI of the client, so that users are better informed and can manage the audio devices in a more reliable and efficient manner. As a result, the users are much less likely to experience a call over the communication system in which they are unable to hear the called party. The call quality perceived by the users is therefore higher.

The flowchart in FIG. 5 applies in the circumstance where either the call is initiated by the user whose output audio device is muted, or where a call is received at the terminal of a user whose output audio device is muted. For example, referring to FIG. 1, if the terminal 104 of the first user "Tom Smith" 102 has an output audio device 310 muted, then the flowchart of FIG. 5 is applied at the terminal 104 if "Tom Smith" 102 initiates a call to "Kevin Jackson" 114 (i.e. "Tom Smith" is the calling party and "Kevin Jackson" is the called party) or if "Tom Smith" 102 is called by "Kevin Jackson" 114 (i.e. "Kevin Jackson" is the calling party and "Tom Smith" is the called party). Note also that this technique applies equally to the case where a VoIP user is calling a PSTN user, or where a PSTN user is calling a VoIP user.

In step S502, a call is initiated by the calling party. For the purposes of explaining FIG. 5, it is assumed that the output audio device 310 of "Tom Smith" 102 is muted. The calling party can either be "Tom Smith" 102 or "Kevin Jackson" 114. In step S504, the call is answered by the called party. It is preferable that the process of FIG. 5 is only executed once the call is answered. This is because this ensures that the call is actually taking place before any changes to the audio device settings are made. In other words, the user must make a positive decision to answer the call, signalling an intention that the call should proceed, before the audio settings are altered.

This is particularly advantageous when a call is received at the terminal which has the muted output device (i.e. the called party has the muted output device). Because the terminal is muted, it will not produce any ringing tone when the incoming call is received. This is desirable, because if the user has deliberately placed the output audio device 310 onto mute, he would not wish for the communication client to ring when there is an incoming call. However, by answering the call (which the user can be alerted to by a message displayed on the screen rather than a ringing tone) the user has indicated a positive intention to continue with the call, thereby indicating that the communication client 110 should determine whether to change the audio settings.

However, it should be noted that, in simpler embodiments, step S504 can be omitted, and the process of FIG. 5 can be executed as soon as the call is initiated rather than once it is answered.

In step S506 the client engine layer 320 of the communication client 10 analyses the state of the output audio device 310. Specifically, the client engine 320 accesses the OS 314 to determine whether the output audio device 310 is set to be muted. If, in step S508, it is determined that the output audio device 310 is not muted, then the call can proceed as normal in step S510. If, however, it is determined in step S508 that the output audio device 310 is muted, then in step S512 the user preferences set by the user of the communication client 110 are analysed. Specifically, the client engine 320 accesses user preference information that is stored on the user terminal 104. The user preferences in question here relate to whether the communication client 110 is permitted to make changes to the audio device settings. In particular, they relate to whether the communication client 110 is able to change the mute settings of the output audio device 310.

Figure 6:
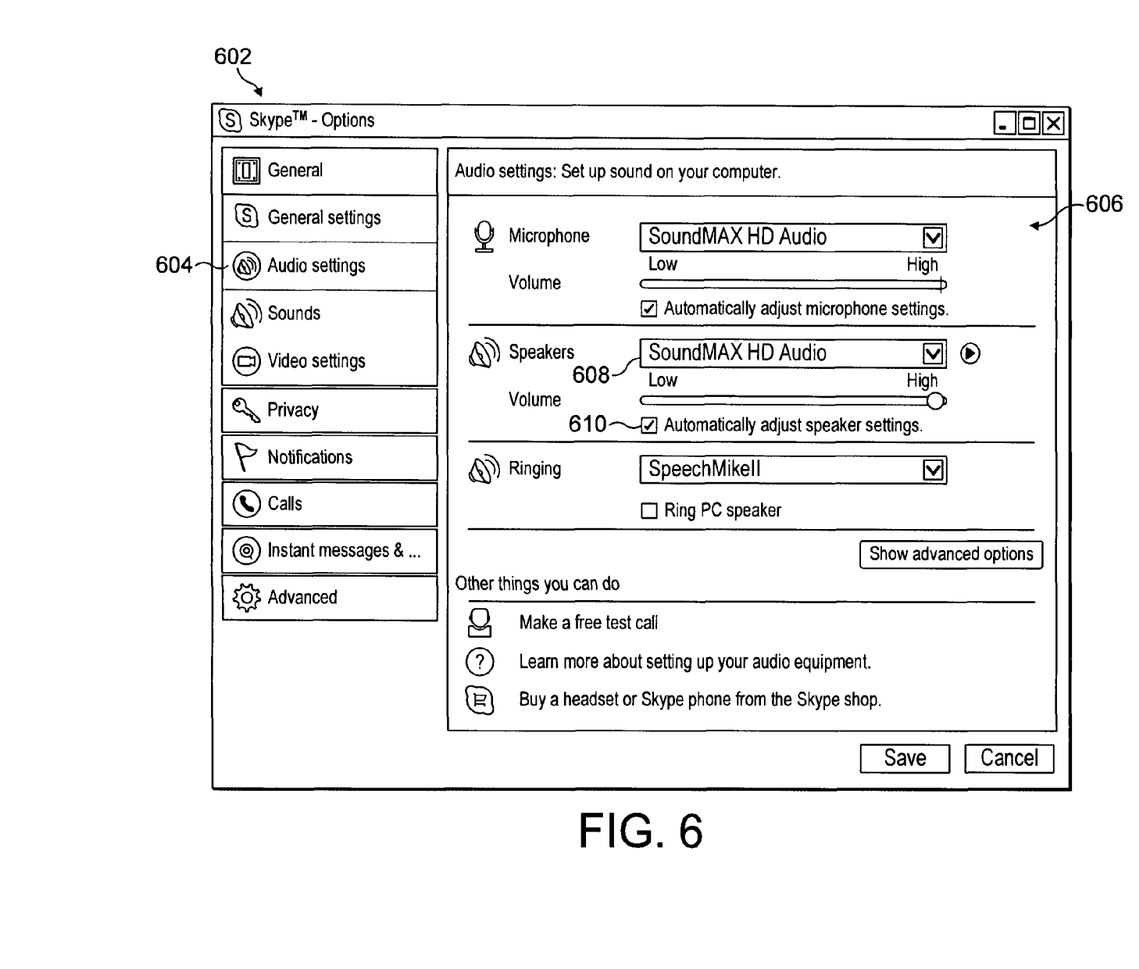
FIG. 6 shows a communication client options window.

The user preferences are controlled through an options window 602, as illustrated in FIG. 6. The options window 602 is accessed by the user selecting a menu item from the tools menu 234 shown in FIG. 2. A category of options is labelled "Audio settings" 604, and when selected by the user the audio settings preferences 606 are displayed. In particular, this display allows the user to select the output audio device 310 using a drop-down menu 608. In addition, a check-box 610 enables the user to select whether he would prefer the communication client 110 to automatically adjust the output audio device 310 settings. More specifically, this option determines whether the communications client 110 can change whether the output audio device 310 is muted.

In step S514, if the check-box 610 has been selected by the user such that the communication client 110 can automatically adjust the output audio device settings, then in step S516 the output audio device 310 is automatically un-muted. This enables the call to continue in step S510 with the output audio device 310 un-muted so that the user is able to hear the other party in the call. Therefore, the communication client 110 has determined that the user wishes to proceed with the call (as it was answered), detected that the output audio device 310 was muted, which would prevent the call from continuing successfully, and automatically changed the settings of the output audio device 310 to counter this. In this way, the communication client 110 has prevented a problem with calling from being experienced by the user, thereby improving the user experience of the communication system.

If, in step S514, it is determined that the user has not selected the check-box 610, then the communication client 110 is not able to automatically adjust the output audio device settings. In this case, the communication client 110 displays a notification message to the user in step S518, instead of automatically un-muting the output audio device 310. The user interface (client UI 322) of the communication client 110 displaying the notification message is shown in FIG. 7.

Figure 7:
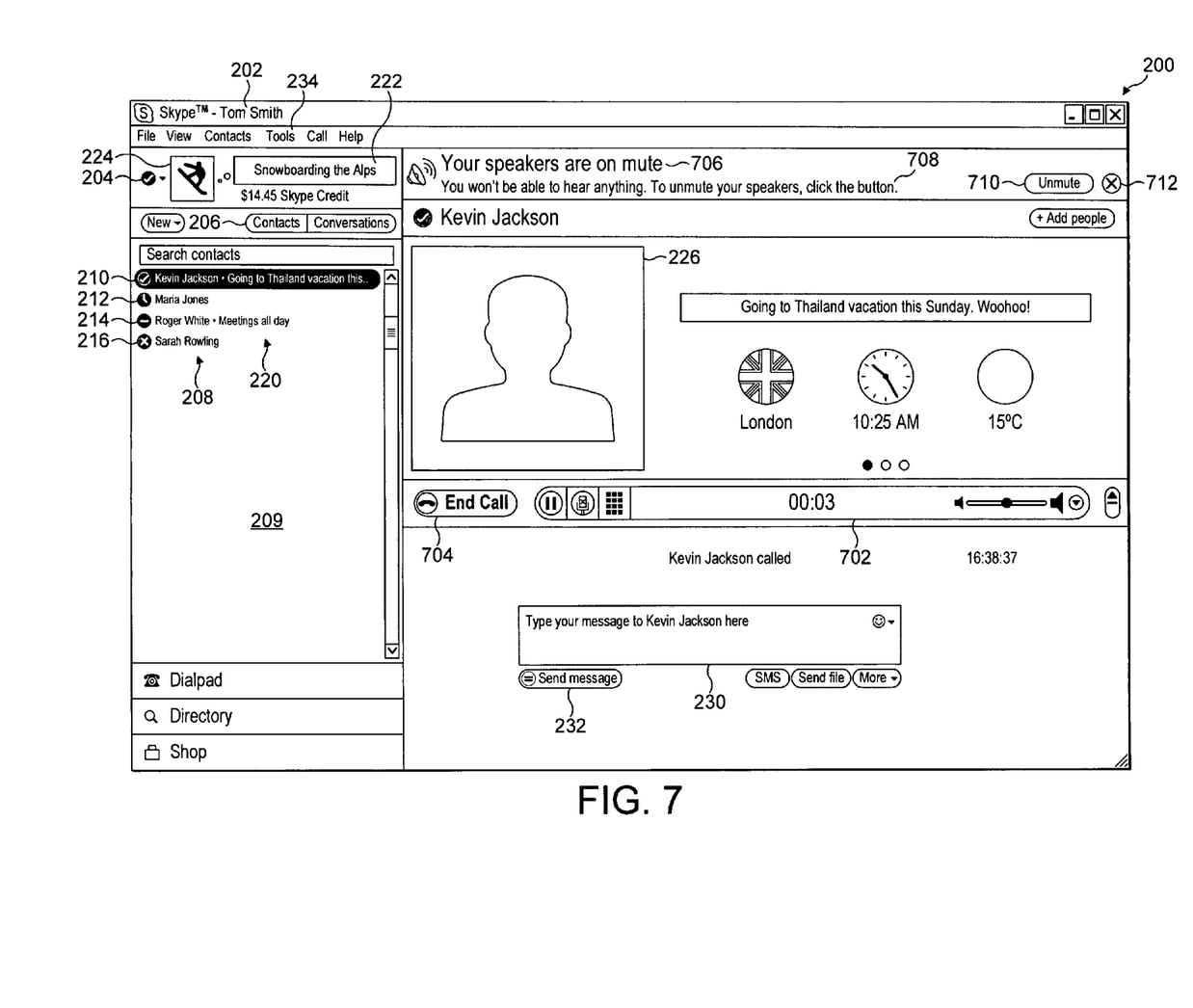
FIG. 7 shows a user interface of a VoIP communication client with a notification message.

The user interface shown in FIG. 7 shows that a call with "Kevin Jackson" has started, as indicated by the presence of a call status bar 702, and an "End call" button 704. A notification message 706 is displayed at the top of the user interface to indicate to the user that the output audio device 310 of his terminal is muted. The message 706 reads "Your speakers are on mute". Below this is a further message 708 which elaborates on the consequences of the audio device being muted. The further message 708 reads "You won't be able to hear anything. To unmute your speakers, click the button". The purpose of the further message 708 is to educate the user, such that it becomes clear that the output audio device settings, which can be controlled through the OS, can affect the operation of the communication client 110. This increases user awareness and avoids similar problems occurring in subsequent calls.

Once the notification message 706 is displayed in the user interface, a timer is started in step S520 of FIG. 5. The timer is used to control the length of time that the notification message 706 is displayed in the user interface. It is preferable that the notification message is not displayed indefinitely in the user interface, as it is possible that the user has deliberately placed the output audio devices on mute.

If the user wishes to continue the call with the output audio device 310 un-muted, he can select an unmute button 710 displayed alongside the notification message 706. Referring again to FIG. 5, in step S522, if the user has selected to unmute the output audio device 310 using the button 710, then in step S524 the output audio device 310 is un-muted by the communication client 110. The user is then able to hear the other party in the call. When the unmute button 710 is selected by the user, the notification message 706 is removed from the UI.

If the user wishes to dismiss the notification message 706 without un-muting the output audio device 310, then he can select a close button 712. If the close button 712 is selected in step S526, then in step S528 the call proceeds, but with the output audio device 310 remaining muted. In this case, the user will not be able to hear any sounds from the other party. However, since the user has been notified of this, and has actively selected to remove the notification without un-muting the output audio device 310, it can be assumed that this state is desired by the user.

If the user does not select either the unmute button 710 or the close button 712, then the notification message 706 will remain displayed in the UI until the timer started in S520 expires. When a timeout occurs in step S530 the notification message 706 is removed from the UI and the call continues in S528 with the output audio device 310 in the muted state.

The process illustrated in FIG. 5 therefore provides a technique for avoiding the situation where the user has placed their output audio device 310 into a muted state, but wants to proceed with a call over the communication system. The communication client 10 will either automatically unmute the output audio device 310 (if permitted by user preferences) or will inform the user of the situation, thereby allowing them to unmute the device if desired.

In addition to un-muting the output audio device 310 when a call is answered over the communication system, it is also preferable that the communication client restores the state of the output audio device 310 to be the same as before the call was answered. To achieve this, the communication client 110 can store a flag to indicate when the output audio device 310 us un-muted (i.e. in step S516 or S524 in FIG. 5). When the call over the communication system is completed, the communication client 110 (specifically the client engine 320) reads the status of the flag to determine whether the output audio device 310 was changed from muted to un-muted. If it was, then the communication client changes the output audio device 310 back to the muted state.

Restoring the state of the output audio device 310 is advantageous because the user may have deliberately set it to mute in order to prevent his user terminal from making sounds (e.g. if he is in a meeting or other quiet location). The user may choose to take a call over the communication system, and the output audio devices can be automatically un-muted to allow the call to proceed (as described above). However, if the output audio devices are not restored to a muted state then the user may be surprised if his user terminal subsequently begins emitting sounds, as he has not deliberately selected to un-mute the output audio device 310. Therefore, by restoring the muted state of the output audio device 310, it can be ensured that the removal of the mute setting only occurs for the duration of the call. The user has given his approval to un-mute the output audio device 310 for the purposes of the call over the communication system (in S514 or S522), but not for any other purpose.

While this invention has been particularly shown and described with reference to preferred embodiments, it will be understood to those skilled in the art that various changes in form and detail may be made without departing from the scope of the invention as defined by the appendant claims. In particular, the above technique was described with reference to a P2P VoIP communication system. The technique can equally be applied to non-P2P VoIP communication systems. In addition, the technique can be applied in the case where a VoIP user is either receiving a call from the PSTN, or making a call to the PSTN network. Furthermore, the technique can also be used for devices that connect to a circuit switched network (such as the PSTN or mobile networks) if the output of such devices can be muted.

What is claimed is:

1. A method of controlling an audio output device at a user terminal configured to connect to a communication network and execute a communication client, comprising:
　　establishing a connection between a user of the user terminal and a further user over the communication network, wherein the establishing the connection comprises one of:
　　　initiating a call by the user of the user terminal to the further user; or
　　　receiving an indication of a call initiated by the further user;
　　determining whether the call initiated by the user of the user terminal or the call initiated by the further user is established, wherein determining whether the call initiated by the user of the user terminal or the call initiated by the further user is established comprises at least receiving a positive indication that the call has been answered by either the user of the user terminal or the further user; and responsive to determining the call initiated by the user of the user terminal or the call initiated by the further user is established:

analyzing the status of the audio output device with the communication client thereby determining that the audio output device is in a muted state; and responsive to said determining that the audio output device is in a muted state, controlling the audio output device to deactivate the muted state such that audio information transmitted from the further user via the connection can be heard by the user of the user terminal, wherein the controlling the audio output device further comprises the communication client accessing data stored at the user terminal to determine whether the communication client is permitted to control the audio output device;

responsive to determining that the communication client is not permitted to control the audio output device, displaying a notification message in a user interface associated with the communication client effective to indicate that the audio output device is in a muted state; and removing the notification message after a predetermined time period, wherein the notification message comprises a user-operable control configured to deactivate the muted state upon actuation by the user.

2. The method according to claim 1, wherein said call is a voice call.

3. The method according to claim 1, wherein said call is a video call.

4. The method according to claim 1, wherein, in the case that the communication client is permitted to control the audio output device, the communication client deactivating the muted state automatically without interaction from the user of the user terminal.

5. The method according to claim 1, wherein the notification message comprises a user-operable control configured to deactivate the muted state upon actuation of the user-operable control.

6. The method according to claim 5, further comprising removing the notification message from the user interface after the notification message has been displayed for a predetermined length of time if the user-operable control is not actuated.

7. The method according to claim 1, wherein the controlling the audio output device to deactivate the muted state comprises storing an indicator that the status of the audio output device has been changed in at least one storage device.

8. The method according to claim 7, further comprising detecting at the communication client that the connection between a user of the user terminal and a further user has been terminated; reading the indicator from the at least one storage device; and restoring the status of the audio output device to the muted state if the status of the audio output device has been changed.

9. The method according to claim 1, wherein the communication network is a packet-based communication network.

10. The method according to claim 9, wherein the packet-based communication network is a voice over internet protocol communication network.

11. The method according to claim 9, wherein the packet-based communication network is a peer-to-peer communication network.

12. A user terminal configured to connect to a communication network, the user terminal comprising:

an audio output device; and a computer processor configured to execute a communication client, wherein the communication client is configured to:

establish a connection between a user of the user terminal and a further user over the communication network, wherein to establish the connection between the user of the user terminal and the further user comprises:

initiating a call by the user of the user terminal to the further user; or receiving an indication of a call initiated by the further user to the user of the user terminal;

for an incoming call to the user terminal:

determine whether the user terminal is in a muted state; and responsive to determining the user terminal is in a muted state, enable display of a visual indication of the incoming call instead of playing an audio ring tone;

determine whether the call initiated by the user of the user terminal or the call initiated by the further user is established at least by receiving a positive indication that the call has been answered by either the user of the user terminal or the further user; and responsive to determining the call initiated by the user of the user terminal or the call initiated by the further user is established:

analyze the status of the audio output device to thereby determine that the audio output device is in a muted state;

determine whether the communication client is authorized to automatically modify the audio output device;

responsive to determining that the audio output device is in a muted state and that the communication client is authorized to automatically modify the audio output device, control the audio output device to deactivate the muted state such that audio information transmitted from the further user via the connection can be heard by the user of the user terminal; and responsive to determining that the audio output device is in a muted state and that the communication client is not authorized to automatically modify the audio output device:

display, in a user interface associated with the communication client, a notification that the audio output device is in a muted state;

display, in the user interface associated with the communication client, a user-operable control configured to enable deactivation of the muted state upon actuation of the user-operable control; and remove the notification message after a predetermined time period if the user-operable control is not actuated.

13. The user terminal according to claim 12, wherein said call is a voice call.

14. The user terminal according to claim 12, wherein said call is a video call.

15. The user terminal according to claim 12, wherein the communication client is further configured to access user preference data stored at the user terminal to determine whether the communication client is authorized to automatically modify the audio output device.

16. The user terminal according to claim 12, wherein the user terminal further comprises at least one storage device, and the communication client is further configured to store an indicator that the status of the audio output device has been changed in the at least one storage device.

17. The user terminal according to claim 16, wherein the communication client is further configured to:
  detect that the connection between a user of the user terminal and a further user has been terminated;
  read the indicator from the at least one storage device; and
  restore the status of the audio output device to the muted state if the status of the audio output device has been changed.

18. The user terminal according to claim 12, wherein the communication network is a packet-based communication network.

19. The user terminal according to claim 18, wherein the packet-based communication network is a voice over internet protocol communication network.

20. The user terminal according to claim 18, wherein the packet-based communication network is a peer-to-peer communication network.

21. A computer program product comprising program code embodied on computer readable storage medium hardware which, responsive to execution by a computer processor, cause the computer processor to execute a communication client that is configured to control an audio output device at a user terminal configured to connect to a communication network by:
  establishing a connection between a user of the user terminal and a further user over the communication network, wherein the establishing the connection comprises:
    initiating a call by the user of the user terminal; or
    receiving an indication of a call initiated by the further user;
  determining whether the call initiated by the user of the user terminal or the call initiated by the further user is established at least by receiving a positive indication that the call has been answered by either the user of the user terminal or the further user;
  responsive to determining the call initiated by the further user or the call initiated by the user of the user terminal is established, analyzing a status of the audio output device with the communication client thereby determining that the audio output device is in a muted state, wherein analyzing the status comprises analyzing a first set of data configured to indicate the muted state;
  responsive to said determining that the audio output device is in a muted state, controlling the audio output device to deactivate the muted state such that audio information transmitted from the further user via the connection can be heard by the user of the user terminal, wherein either the call initiated by the user of the user terminal is answered by the further user or the call initiated by the further user is answered by the user of the user terminal before the muted state of the audio output device is deactivated, and wherein controlling the audio output device is based, at least in part, on a second set of data configured to indicate whether control of the audio output device by the communication client is permitted; and
  responsive to identifying an incoming call to the user terminal:
    determining whether the user terminal is in a muted state;
    responsive to determining the user terminal is in a muted state, displaying a visual indication of the incoming call in a user interface associated with the communication client instead of playing an audio ring tone;
    enabling the incoming call to be answered without unmuting audio;
    responsive to determining that the communication client is not permitted to control the audio output device, displaying an first indication in the user interface associated with the communication client that the audio output device is muted after the call initiated by the user of the user terminal or the call initiated by the further user is established, wherein the first indication comprises a user-operable control configured to deactivate the muted state upon actuation; and
    removing the first indication after a predetermined time period if the user-operable control is not actuated.

22. The computer program product as recited in claim 21, wherein the communication client is further configured to control the audio output device by displaying a visual notification when the second set of data indicates that control of the audio output device is not permitted.

23. The computer program product as recited in claim 21, wherein control of the audio output device further comprises automatic modifications to the audio output device by the communication client when the communication client is permitted to control the audio output device.

24. The computer program product as recited in claim 21, wherein the communication client is further configured to control the audio output device by, upon termination of the call, restoring the audio output device to a muted state if a status indicates the audio output device was changed upon answering the call.

25. The computer program product as recited in claim 21, wherein the communication client is further configured to control the audio output device by displaying a second indication associated with the audio output device being muted, the second indication comprising instructions associated with unmuting the audio output device.

26. The computer program product as recited in claim 21, wherein the communication network comprises a packet-based communication network.

27. The computer program product as recited in claim 26, wherein the connection between the user of the user terminal and a further user comprises a voice-over-internet protocol (VoIP) connection.

* * * * *